United States Patent [19]

Reed, Jr.

[11] 4,431,152
[45] Feb. 14, 1984

[54] ADJUSTABLE CABLE RESTRAINT ASSEMBLY

[75] Inventor: Thomas W. Reed, Jr., Peru, Ind.

[73] Assignee: Square D Company, Palatine, Ill.

[21] Appl. No.: 329,495

[22] Filed: Dec. 10, 1981

[51] Int. Cl.³ .............................................. F16L 3/08
[52] U.S. Cl. .................................. 248/65; 248/68 CB
[58] Field of Search ................. 248/65, 68 R, 68 CB, 248/67.5

[56] References Cited

U.S. PATENT DOCUMENTS

| | | | |
|---|---|---|---|
| 910,975 | 1/1909 | Vickers | 248/67.5 |
| 911,864 | 2/1909 | Ball | 248/67.5 |
| 3,246,076 | 4/1966 | Stoneburner | 248/67.5 |
| 3,526,934 | 9/1970 | Owen, Sr. | 248/68 CB |
| 3,894,706 | 7/1975 | Mizusawa | 248/68 CB |

Primary Examiner—William H. Schultz
Assistant Examiner—Ramon O. Ramirez
Attorney, Agent, or Firm—Larry I. Golden; Richard T. Guttman

[57] ABSTRACT

An assembly for restraining movement of a plurality of cables within an electrical housing including a pair of mating elements which, upon being operably associated, form a passageway therebetween for the passage of cables. Each mating element has a plurality of spaced-apart, outwardly extending finger layers on opposite sides of the passage and further includes a recessed receiving portion intermediate each of the finger layers for receiving a portion of the finger layers of the associated mating element.

15 Claims, 9 Drawing Figures

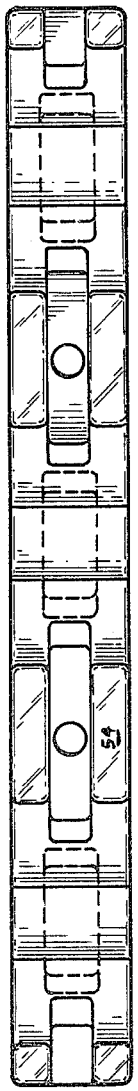
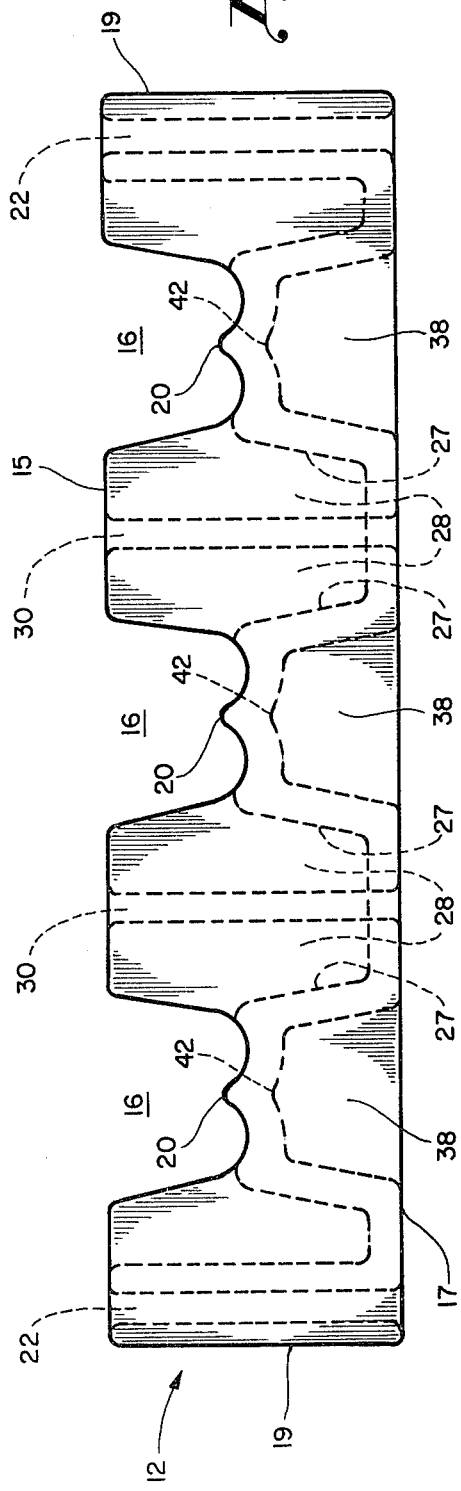
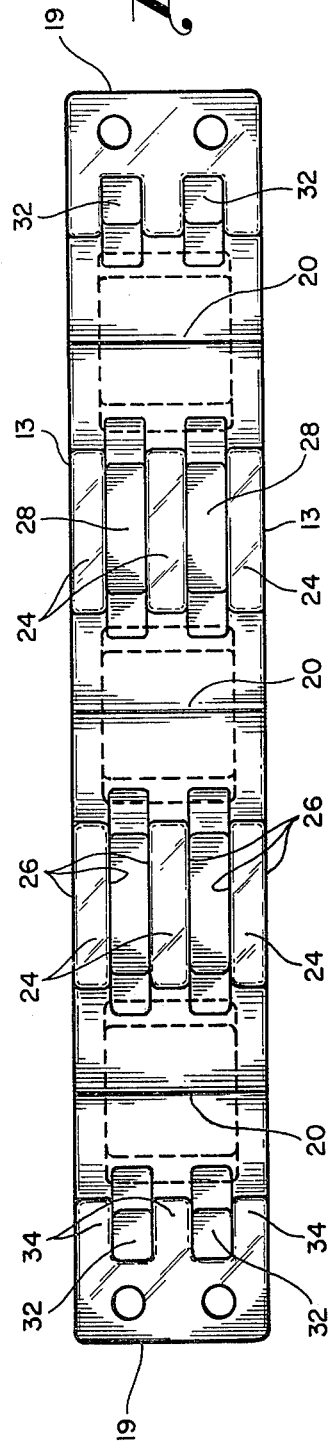

ADJUSTABLE CABLE RESTRAINT ASSEMBLY

BACKGROUND OF THE INVENTION

1. Field of the Invention

This invention relates in general to a cable restraint assembly and more particularly to an improved adjustable cable restraint capable of restraining various numbers and sizes of incoming feeder cables for motor control centers and switchboards.

2. Summary of the Prior Art

The electromagnetic forces generated by the large currents present during short circuit conditions in motor control centers and switchboards cause whipping of the incoming feeder cables. Underwriters Laboratories' Test No. 845, Section 22.30, relating to short circuit testing of motor control centers, establishes criteria for determining permissible degrees of cable movement. This section is reproduced below to illustrate the type of damage which may result in the event cables are not sufficiently restrained from motion during short circuit conditions:

Short-Circuit-Test Evaluation 22.30 After a motor control center has been tested under any of the short-circuit conditions described in paragraphs 22.28 and 22.29, the results are acceptable if the motor control center is in substantially the same mechanical condition as prior to the test, and if:

A. There is no permanent distortion or displacement of the bus bars or cable that would affect the normal functioning of the bus assembly, or reduce spacings to less than 75 percent of those specified in Table 15.1.

B. There is no distortion of a plug-in bus assembly that would impair normal insertion of a plug-in unit such as a motor control or feeder tap unit.

C. There is no cracking or breakage of an insulating base to the extent that the integrity of the mounting of live parts is impaired.

D. The fuse described in paragraph 22.16 has not opened.

E. The enclosure or a part of the enclosure has not been damaged or displaced to the extent that a live part is accessible to a test rod (1) 33/64 inch (13.2 mm) in diameter for any opening less than 4 inches (107 mm) from an uninsulated live part or (2) 49/64 inch (19.4 mm) in diameter for any opening 4 inches or more from such a part. A door shall not open.

F. There is no damage due to arcing.

G. There is no damage to a conductor or terminal connector and the conductor has not pulled out of the terminal connector.

H. The motor control center complies with the dielectric voltage-withstand test described in paragraphs 22.31-22.33.

Sections A, C, D, E and G of Section 22.30 can be affected by insufficient restraint of the cables.

Heretofore, various means have been employed to prevent damage from such cable motion. One such clamp assembly, shown in FIG. 1 of the Drawings, includes identical, opposite, abutting clamp members a and b having grooves c in facing relationship to one another which provide a restraining passage for cable which extend therethrough. The opposite portions of the clamp assembly are fastened together by spaced apart bolts d at various locations along the length of the clamp assembly. This assembly is not readily adapted to receive various numbers and sizes of cable and, further, requires numerous bolts to provide sufficient cross-section to counteract shearing forces generated by the attempt lateral motion of the cables.

SUMMARY OF THE INVENTION

The present invention provides a two-part cable restraint of novel design molded of a synthetic rubber or elastomeric plastic.

It is an object of the invention to provide a cable restraint which is adjustable for a range of wire sizes from (1) 3/0 MCM cable through and including (6) 750 MCM cables.

It is a further object of the invention to prevent sharp bends in the cable during short circuit conditions which will cause deterioration of the cable insulation.

It is a further object of the instant invention to provide an adjustable cable restraint adapted for use with various numbers of cables of different sizes which can be readily installed.

Other features, objects and advantages will become apparent from the description of claims taken together with the following Figures in the Drawings.

BRIEF DESCRIPTION OF THE DRAWINGS

FIG. 5 is a side view of the movable portion of the cable restraint.

FIG. 6 is a top view of the stationary portion of the cable restraint.

FIG. 7 is a side view of the stationary portion of the cable restraint.

DESCRIPTION OF THE PREFERRED EMBODIMENT

Figure 3:
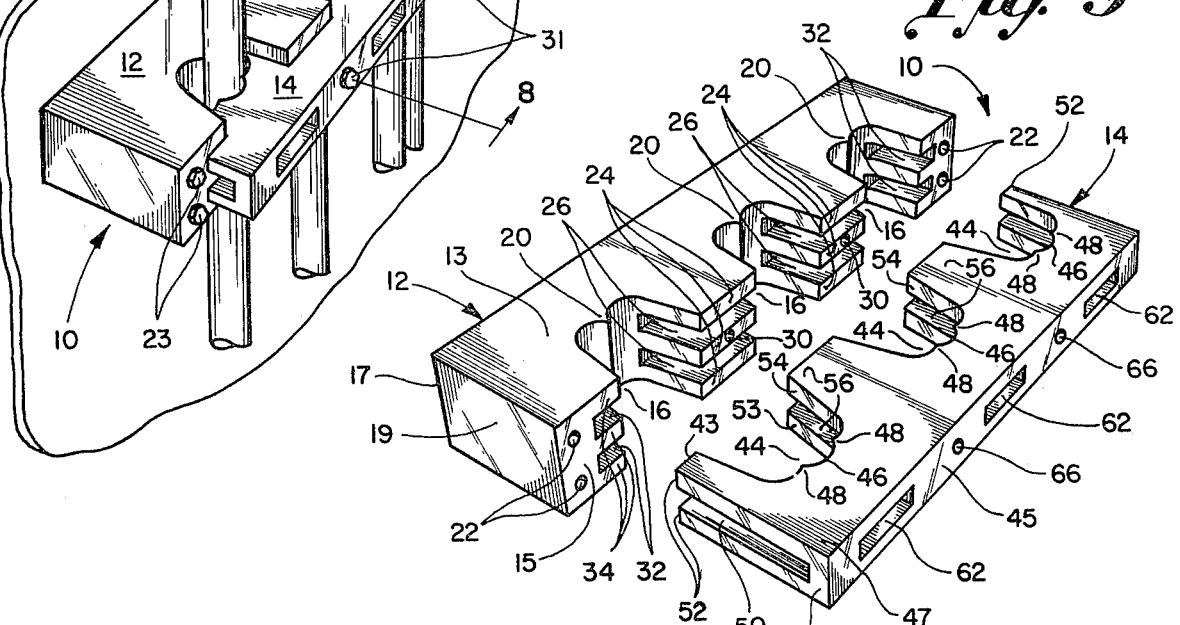
FIG. 3 is a perspective view of the stationary portion and movable portion of the cable restraint.
Figure 4:
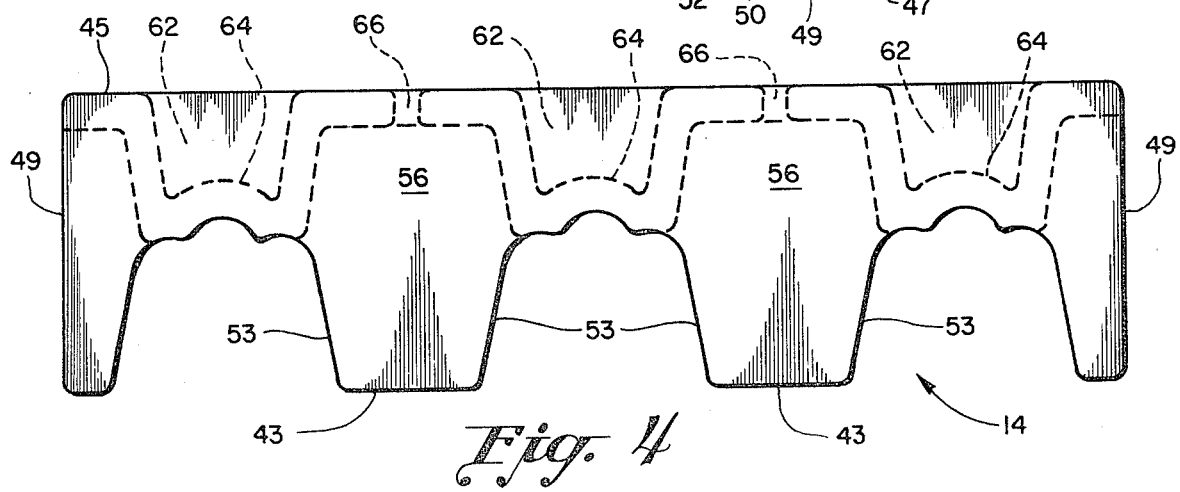
FIG. 4 is a top view of the movable portion of the cable restraint.

As shown in FIG. 3 of the Drawings, the cable restraint assembly identified generally by reference numeral 10 is comprised of two separate parts. A stationary brace 12 is fixedly mounted within a motor control center or some other piece of electrical equipment while movable portion 14 is adjustably associated with stationary portion 12 in order to accommodate the restraint of various numbers and various sizes of cable. The stationary and movable portions of the cable restraint are each formed of a thermoplastic polyester sold under the trademark "Hytrel" by Dupont Company having main offices in Wilmington, Del. The brace could also be molded of a synthetic rubber or elastomeric plastic.

The stationary portion of the cable brace takes the form of a generally rectangular block with identical top and bottom surfaces 13, a first side surface 15, a second side surface 17 and opposite end surfaces 19. A number of generally U-shaped cutouts 16 are provided along the first side surface, through which pass cables 18. The stationary portion 12 has a length of approximately 18.5 inches and a width of approximately 4.25 inches along top and bottom surfaces 13. The cutouts 16 form openings approximately 3 inches in length along said first side surfce of the stationary brace 12. The legs of the cutout portion taper slightly towards each other as they extend inward approximately 2 inches. A rib 20 is formed along the central portion of the base of each U-shaped cutout portion 16.

Figure 2:
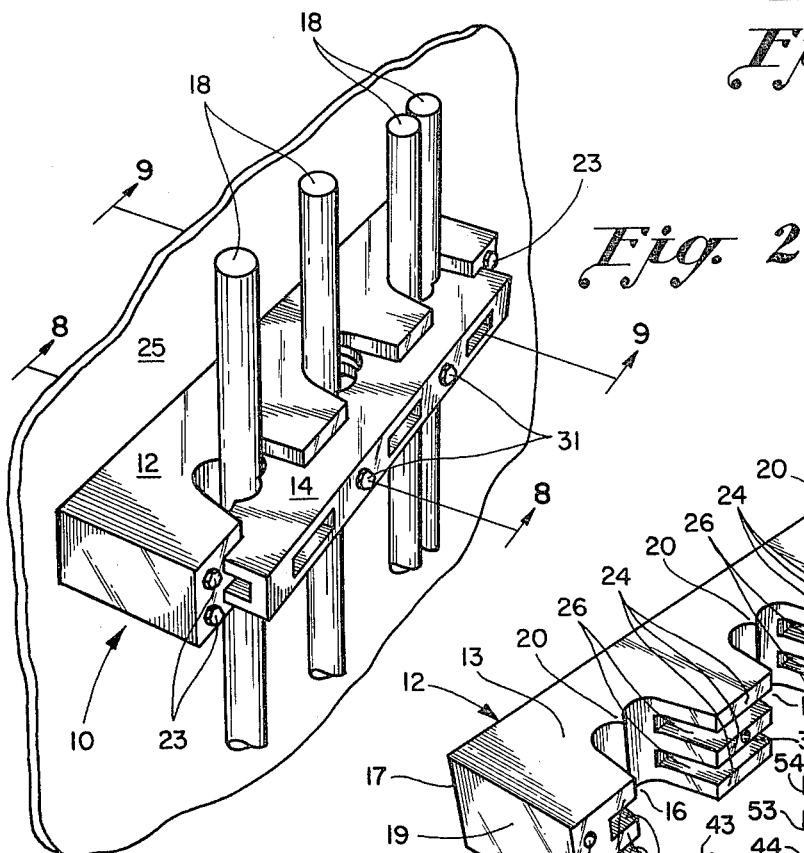
FIG. 2 is a perspective view of the improved cable restraint assembly in operation.

Two passages 22 are provided at each end of the stationary cable brace facilitating the fixed mounting of the stationary portion of the cable restraint. The restraint assembly may be fastened by bolts 23 or some other fastening device to a support 25 within an electrical enclosure as shown in FIG. 2 of the Drawings. The support may take the form of a wall or be comprised of one or more rails A plurality of finger layers 24 having planar contact surfaces 26 are formed intermediate the cutout openings 16 and extend outward toward the first side of the stationary cable brace. The finger layers span approximately 2.5 inches along the first side and have a thickness of approximately 9/16 inches. A plurality of recesses 28 are formed adjacent the base portion of cutout 16 intermediate the U-shaped cutout portions enabling contact surfaces 26 to extend from the first side surface of the cable brace substantially near to the second side surface.

As shown in FIG. 3, there are three finger layers 24 between each cutout portion. The center layer intermediate each cutout portion includes a passage 30 which receives a bolt 31 that serves to secure the movable portion of the brace to the stationary portion. A pair of channels 32 are formed adjacent opposite ends of the brace and intersect the outer leg of each outer cutout portion forming finger layers 34 at each end of the brace. The channels 32 extend rearward to a point near the second side of the brace. The contact surfaces of the layers 24 and 34 are coplanar and adapted to respectively receive projecting layers and fingers of movable portion 14 of the brace.

While the forward side of the stationary brace includes a plurality of cutout portions 16, the rearward side includes large recess portions 38 in back to back relationship with the U-shaped cutouts. The base of each recess 38 includes two slightly curved surfaces 40 which meet along a line forming an apex 42 approximately one half inch rearward of rib 20.

The movable portion 14 is a thinner, generally rectangular block having a first side 43, an opposite second side 45, top and bottom surfaces 47 and opposite end surfaces 49. Cutout portions 44 are spaced apart along the first side of this block and aligned to be in facing relationship with the cutouts 16 of stationary brace member 12 when movable brace member 14 is connected thereto. Cutout portions 44 are also generally U-shaped, with the legs of each U being spaced apart approximately 3.5 inches and having approximately 2 inches between the cutout portions. The cutout portions 44 extend approximately 2.5 inches toward the rear of the brace and include an additional scooped out portion 46 at the base of the U providing a pair of ribs 48 in the base of each cutout portion. A channel 50 is provided at each end of the movable brace providing fingers 52 extending outward toward the first side of the movable brace portion at each end.

A pair of finger layers 54 are provided intermediate each cutout portion 44 on the movable portion of the brace much the same as finger layers 24 are provided on the stationary portion of the brace. The finger layers each include a pair of contact surfaces 56, with outer contact surfaces 56 of each pair of finger layers 54 being coextensive with the top and bottom portions 47 of the movable brace portion. The second side 45 of the movable brace portion includes recessed areas 62 being each cutout 44. The back wall 64 of the recessed area is convex and approximates a concentric arc about scooped area 46 of the cutout portion 44. The inner contact surfaces 56 of the finger layers 54 extend rearward from said first side of said brace to a point substantially near said second side 60 of said brace.

The finger layers 54 of the movable portion of the brace are received between finger layers 24 on the stationary portion of the brace in interleaving relationship, while fingers 52 of the movable brace are received in channels 32 of the stationary portion of the brace.

The distance between top and bottom surfaces 13 of stationary brace 12 is approximately 3 inches, while the distance between top and bottom surfaces 47 of movable brace portion 14 is approximately 1.75 inches. In use, the brace assembly is engaged with a substantial length of cable extending therethrough, providing greater support and reducing the likelihood of sharp cable bends on each side of the brace which can break the cable insulation.

Figure 8:
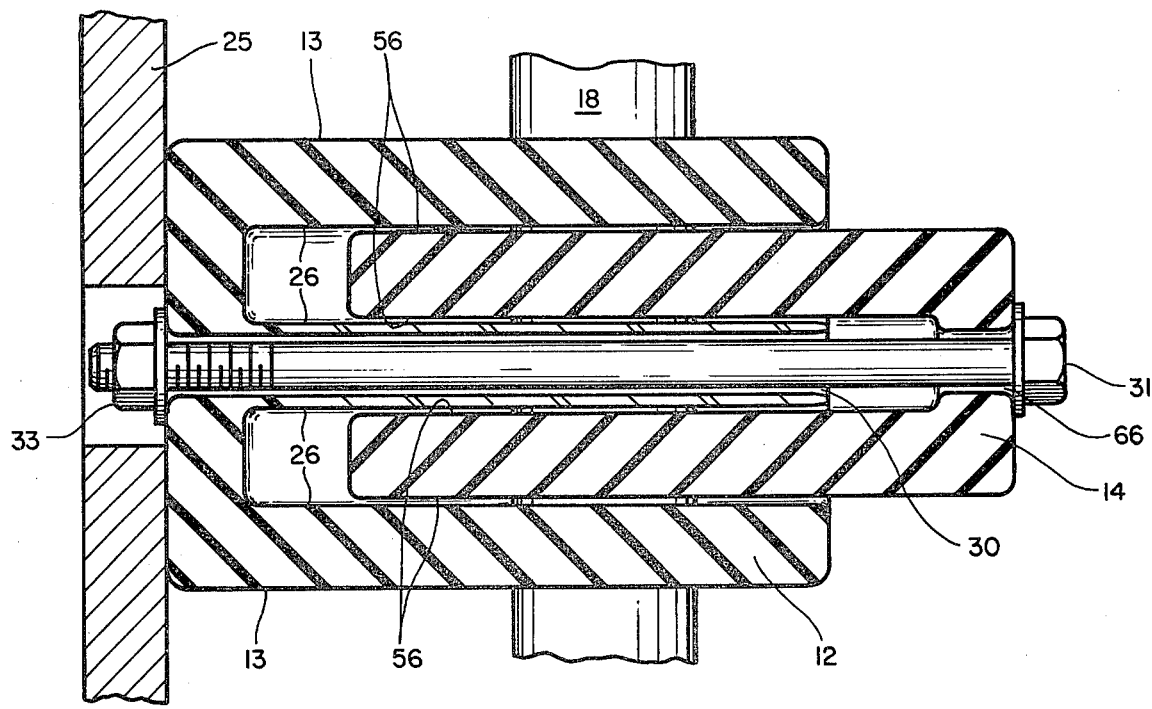
FIG. 8 is a sectional view taken along lines 8—8 in FIG. 2 through the fingered layers of the restraint assembly.
Figure 9:
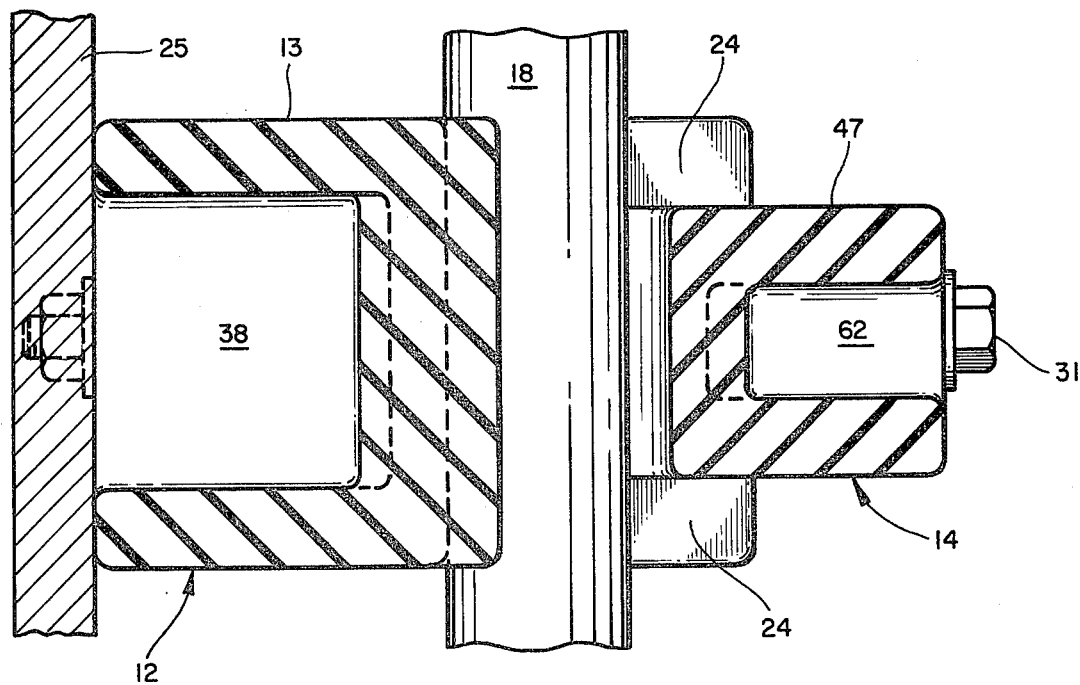
FIG. 9 is a sectional view taken along lines 9—9 in FIG. 2 through the cutout portion of the restraint assembly.

Passages 66 are provided in the movable portion of the brace in registration with passages 30 of the stationary portion of the brace. As shown in FIG. 8, a bolt 31 which extends through passage 66 of movable brace 14 and through passage 30 of the stationary brace 12 is captured by a nut 33 adjacent the second side of the stationary portion of the brace.

Strength of the brace assembly is enhanced by the multiple interleaving fingers and layers of the connected movable and stationary braces. As can be seen from FIGS. 2 and 8, contact surfaces 56 of the finger layers of movable brace 14 are in close fitting abutting relationship with contact surfaces 26 of the finger layers of stationary brace 12, while outer surfaces 47 of the fingers 52 are in closed fitting abutting relationship with the contact surfaces of layers 34 of the stationary brace. This relationship prevents relative vertical motion between the stationary and movable portions of the brace. The ends 49 of the movable portion are in close fitting abutting relationship with the base of channels 32, while the sides 53 of layers 54 are in close fitting relationship with the side walls 27 of recesses 28 of the stationary brace, when the movable brace is fully inserted into the stationary brace. The abutting relationship at the base of channels 32 and at the side walls of recesses 28 prevent relative horizontal movement of the braces. The interleaving relationship between the stationary and movable braces which prevents relative vertical and horizontal movement between the braces relieve shearing forces on bolts 31.

Figure 1:
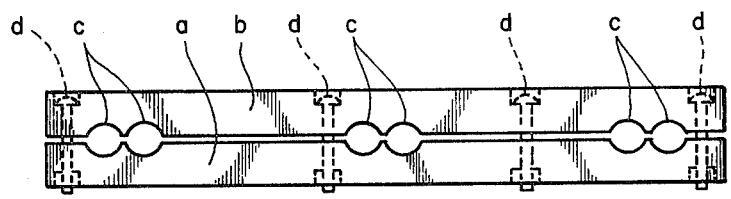
FIG. 1 is illustrative of a prior art cable restraint.

The bolts d shown in prior art devices in FIG. 1 are subject to strong shearing forces as well as tensile forces during short circuit conditions while bolts 31 of the instant invention need only withstand the tensile forces which tend to separate the two brace portions 12 and 14.

The channels 32 and recesses 28 of the stationary brace are adapted to receive the fingers 52 and layers 54 of the movable brace so that the movable brace is substantially received by the stationary brace. The bolts 31 are long enough to provide for adjustable fastening of the movable brace to the stationary brace depending on the number of cables being restrained by the brace assembly. The cutout configurations 16 and 44 previously described have been found to facilitate restraint of various sizes and various numbers of cable. Anywhere from one to six cables of various sizes can be fixedly secured within the passage formed by cutout portions 16 and 44.

While the invention has particularly been shown and described with reference to a preferred embodiment it will be understood by those skilled in the art that variations in form, construction and arrangements may be made therein without departing from the spirit and scope of the invention. All such variations are intended to be covered in the appended claims.

I claim:

1. A cable restraint for restraining movement of electrical cables within an electrical housing containing a support member, said restraint comprising: a first mating element, a second mating element;
    connecting means for connecting said first and second mating elements together; said elements having portions defining a passage therebetween;
    securing means for securing one of said elements to said support member;
    said mating elements each having a plurality of spaced apart outwardly extending finger layers on opposite sides of said passage, each mating element including a recessed receiving portion intermediate said finger layers for receiving a portion of the finger layers of the respective other mating element to provide increased vertical and lateral stability to said restraint, said recessed receiving portions each including a pair of opposite side walls.

2. A cable restraint as claimed in claim 1 including a channel at each end of said first element, a finger portion extending from each end of said second element fittingly received within a respective one of said channels.

3. A cable restraint as claimed in claim 2 wherein said passage is comprised of a first generally U-shaped cutout portion in said first mating element, a second generally U-shaped cut-out portion provided in said second mating element in open end facing relationship with said first cut-out portion.

4. A cable restraint as claimed in claim 3 wherein the base of said first U-shaped cut-out portion includes a first rib positioned substantially equidistant from the opposite legs of the U, and the base of said second U-shaped cut-out portion includes a pair of second ribs, each of said second ribs positioned to face the base of said first cut-out portion on an opposite side of said first rib.

5. An adjustable cable brace assembly for restraining movement of electrical cables within an electrical housing containing a support rail, said assembly comprising:
    a first generally rectangular insulating block member having first and second opposite side surfaces and top and bottom surfaces, said first side surface including a plurality of spaced apart generally U-shaped cut-out portions extending from said top surface to said bottom surface;
    a plurality of first finger layers intermediate said cut-out portions extending toward said first side surface;
    said first side surface including a channel portion adjacent each opposite end extending inward from said first side surface toward said second side surface;
    a second generally rectangular insulating block member having first and second opposite side surfaces and top and bottom surfaces, said first side surface including a plurality of spaced apart generally U-shaped cut-out portions extending from said top surface to said bottom surface;
    a plurality of second finger layers provided intermediate said cut-out portions on said second block member;
    each set of said second finger layers arranged in interleaving relationship with a respective set of said first finger layers;
    said second block member including a projecting finger portion at each opposite end received in the respective channels of said first block member;
    connecting means for adjustably connecting said first block member to said second block member; and
    securing means for securing said first block member to said support rail.

6. An adjustable cable brace assembly as claimed in claim 5 wherein said first finger layers are vertically spaced apart from each other by a predetermined distance and each first layer has opposite contact surfaces spaced apart from each other by a fixed distance;
    said plurality of second finger layers being vertically spaced apart from each other by approximately said fixed distance and each of said second layers having opposite contact surfaces spaced apart by approximately said predetermined distance.

7. An adjustable cable brace assembly as claimed in claim 6 wherein said contact surfaces of said first finger layers extend from said first side to a point substantially near said second side; a recessed area formed intermediate said finger layers, each said recess area formed by and including a back wall, opposite side walls and said contact surfaces; said second finger layers including a front wall on said first side and opposite side walls bridging said opposite contact surfaces of each said second layer, said recesses being formed to receive a respective second finger layer.

8. An adjustable cable brace assembly as claimed in claim 7 wherein said connecting means includes a first passage formed in the stationary brace extending from said first side to said second side intermediate opposite contact surfaces of one of said first finger layers; a second passage in said movable brace in registration with said first passage, said second passage having longitudinal axis extending intermediate a pair of said second finger layers; a bolt extending from said second side of said movable brace through said first and second passages to said second side of said stationary brace and having a head adjacent said second side of said movable brace and a nut adjacent said second side of said stationary brace.

9. An adjustable cable brace assembly as claimed in claim 8 including second recess portions in back to back relationship with said U shaped cutouts in said stationary brace, each said second recess portion having a base and four side walls.

10. An adjustable cable brace assembly as claimed in claim 9 wherein each generally U shaped cutout portion of said stationary brace includes a base and opposite side legs, said base including a rib extending from said top surface to said bottom surface approximately equidistant from said side legs.

11. An adjustable cable brace assembly as claimed in claim 10 wherein each generally U shaped cutout portion on said movble brace includes a base and opposite side legs, said base of said cutout portion on said movable brace having a pair of ribs extending from said top surface of said movable brace to said bottom surface of said movable brace, and a concave arc portion provided intermediate said pair of ribs.

12. An adjustable cable brace assembly as claimed in claim 11 wherein said first insulating block member includes a plurality of channel portions adjacent each opposite end extending inward from said first side surface to said second side surface; and
  said second block member including a corresponding number of said projecting finger portions at each opposite end received in a respective channel of said first block member.

13. An adjustable cable brace assembly as claimed in claim 12 wherein said securing means comprises a plurality of bolt receiving apertures extending through said first block member from said first side surface to said second side surface, each said aperture having a longitudinal axis in parallel relationship with each first passage.

14. An adjustable cable brace assembly for restraining movement of electrical cables within an electrical housing containing a support structure, said assembly comprising:
  a first generally rectangular block member having first and second opposite side surfaces, top and bottom surfaces and opposite end surfaces, said first side surface including a first plurality of spaced apart generally U-shaped cutout portions extending from said top surface to said bottom surface, said top surface being spaced a given distance from said bottom surface and said opposite end surfaces being spaced a set distance from each other;
  a second generally rectangular block member having first and second opposite sides surfaces, a top surface, a bottom surface and opposite end surfaces, said first side surface of said second block member including a second plurality of spaced apart generally U-shaped cutout portions extending from said top surface to said bottom surface, said top surface being spaced from said bottom surface by a distance less than said given distance and said opposite end surfaces of said second block member being spaced apart by a distance less than said set distance;
  said second block member including a second plurality of finger layers provided intermediate the cut-out portions and a projecting finger portion extending towards said first side surface at each opposite end of said member;
  receiving means provided on said first block member for receiving said finger layers and said finger portions;
  connecting means for adjustably connecting said second block member to said first block member; and
  securing means for securing said first block member to said support structure.

15. An adjustable cable brace assembly as claimed in claim 14 wherein said receiving means comprises a first plurality of finger layers intermediate said first plurality of cut-out portions and a channel portion extending from said first side surface of said second block member toward said second side surface of said second block member adjacent opposite ends of said second block member.

* * * * *